United States Patent [19]

Predhome, Jr.

[11] E Re. 30,188

[45] Reissued Jan. 15, 1980

[54] VALVE TRAIN FOR INTERNAL COMBUSTION ENGINE

[76] Inventor: Wilfred F. Predhome, Jr., 487 Ursula St., Aurora, Colo. 80011

[21] Appl. No.: 889,145

[22] Filed: Mar. 22, 1978

Related U.S. Patent Documents

Reissue of:

[64] Patent No.: 4,061,115
Issued: Dec. 6, 1977
Appl. No.: 691,429
Filed: Jun. 1, 1976

[51] Int. Cl.[2] ..... F01L 1/34

[52] U.S. Cl. ..... 123/90.16; 123/90.21; 123/90.24; 123/90.26; 74/57

[58] Field of Search ..... 123/90.2, 90.26, 90.25, 123/90.17, 90.21, 90.24, 90.15, 90.16, 90.6; 74/57, 568

[56] References Cited

U.S. PATENT DOCUMENTS

| | | | |
|---|---|---|---|
| 1,177,428 | 3/1916 | Melin | 74/57 |
| 2,664,866 | 1/1954 | Fulke | 74/57 |
| 3,107,541 | 10/1963 | Parsus | 74/57 |
| 3,270,360 | 9/1966 | Kropp | 74/57 |
| 3,492,880 | 2/1970 | Pearson | 74/57 |
| 3,696,682 | 10/1972 | Matas | 74/57 |
| 3,703,834 | 11/1972 | Beezer | 74/57 |
| 3,816,031 | 6/1974 | Joyce | 74/57 |

FOREIGN PATENT DOCUMENTS

| | | | |
|---|---|---|---|
| 78915 | 5/1918 | Switzerland | 74/57 |

*Primary Examiner*—Charles J. Myhre
*Assistant Examiner*—Jeffrey L. Yates
*Attorney, Agent, or Firm*—Sheridan, Ross, Fields & McIntosh

[57] ABSTRACT

A system for varying valve timing; i.e. the rotational angle of the crankshaft during which an intake or an exhaust valve of a cylinder of a reciprocating internal combustion engine is open which results in varying valve overlap, and for varying valve lift of such intake and exhaust valves. A desmodromic cam and cam follower convert rotation of a cam shaft to reciprocating rotation, or oscillation, of the cam follower. The reciprocating rotation of the cam follower is converted by the interaction of a secondary cylindrical cam, a cylindrical control ring, and a reciprocating member to linear motion of the reciprocating member which reciprocating member is operatively connected to a poppet valve. Timing and lift of the reciprocating member and valve are variable over predetermined limits as a function of engine rpm and load by rotation of the cylindrical control ring. Each valve train positively closes as well as opens its associated valve.

11 Claims, 9 Drawing Figures

VALVE TRAIN FOR INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention is in the field of valve train or valve operating mechanisms for internal combustion engines and more particularly variable valve timing and valve lift mechanisms.

2. Description of the Prior Art

The desirability of varying valve timing and valve overlap; i.e., the angle of rotation of the crankshaft of a reciprocating internal combustion engine during which both exhaust and intake valves of a cylinder are open, as a function of speed and load to optimize the efficiency of a reciprocating internal combustion engine under any given operating condition has been recognized. The prior art solutions teach the use of a valve train including a single lobed cam on a rotating cam shaft with a tappet engaging the lobed cam to convert circular motion to reciprocating linear motion of a tappet which is operatively connected directly to a valve as in an overhead cam shaft type engine or through a rocker arm. A heavy duty spring biases the valves closed and the tappet against the cam surface. Changes in timing are accomplished by changing the length of an element in the valve train, the location of the cam shaft lobe to the tappet, or by varying the axis of rotation of rocker arms.

SUMMARY OF THE INVENTION

The present invention provides a valve train that does not use a lobed cam surface on a rotating cam shaft but rather a cam surface in the form of a groove of constant radius in the shaft which causes a cam follower engaging said groove to convert rotation of the cam shaft into reciprocal rotation, or oscillation, of the cam follower. The reciprocal rotation of the cam follower is converted by a secondary cam reciprocally rotated by the cam follower and a control ring into reciprocal linear motion of a reciprocating member which is operationally connected directly to a poppet valve or through a rocker arm. Movement of the control ring changes the valve timing as measured by crankshaft position and valve lift so that optimum valve timing and valve lift for substantially all operating conditions of a reciprocating internal combustion engine can be achieved.

It is, therefore, an object of this invention to provide a valve train which provides optimum valve timing and valve lift over all engine speeds and loads for which a reciprocating internal combustion engine is designed which will reduce engine emissions below that experienced with conventional valve trains.

It is another object of this invention to provide a valve train that requires significantly less power to operate a valve.

It is still another object of the invention to provide a valve train which is relatively quiet.

It is a further object of this invention to provide a valve train in which the mass of the valve train in reciprocating linear motion is minimized.

It is another object of the invention to provide a valve train which can be manufactured economically.

BRIEF DESCRIPTION OF THE DRAWING

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
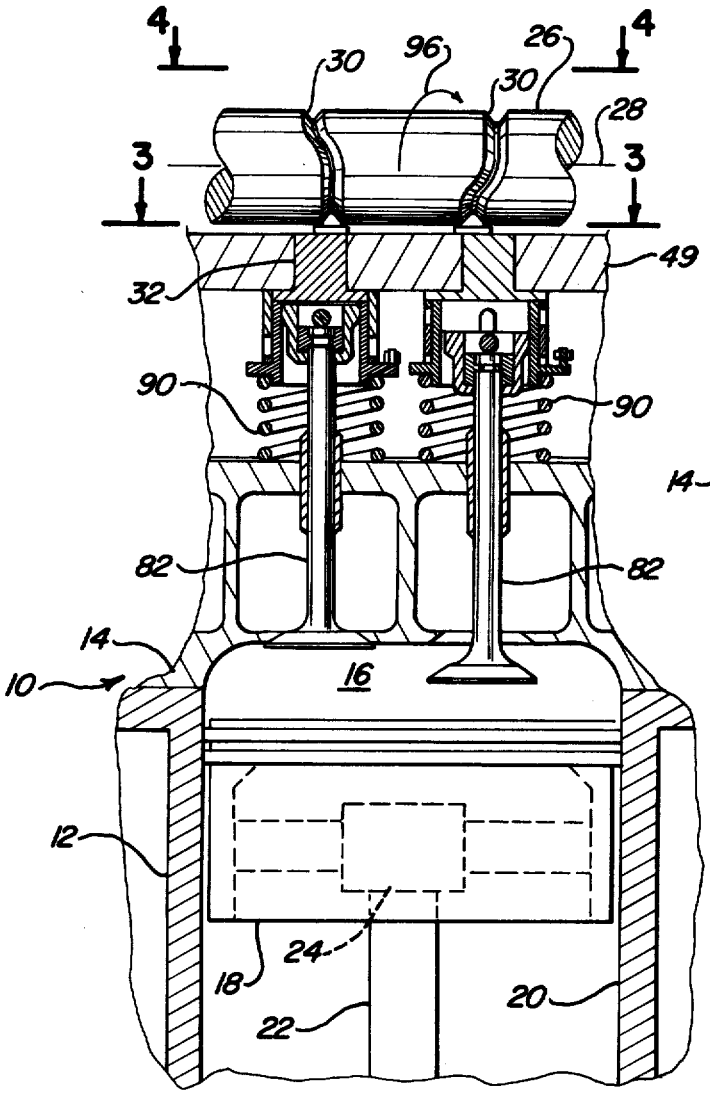
FIG. 1 is a fragmentary view in section of a conventional internal combustion engine of the overhead cam type showing the valve trains or valve operating mechanisms for one cylinder of an engine.

Referring to FIG. 1, reciprocating internal combustion engine 10 has a cylinder block 12, a cylinder head 14 which defines a combustion chamber 16. Piston 18 is mounted for reciprocating movement in cylinder 20 formed in block 12. A connecting rod 22 is pivotally secured to piston 18 by means of a conventional wrist pin 24. The lower end of connecting rod 22 is connected to a conventional crankshaft, which is not illustrated. Cam shaft 26 is mounted on engine 10 for rotation about its axis of rotation 28 by conventional journal bearings, which are not illustrated, and is driven by the crankshaft, for example, by means of a timing belt and pulley which are also not illustrated since they are conventional and well known to those skilled in this art. Cam shaft 28 normally completes one revolution for every two revolutions of the crankshaft of engine 10.

Cam shaft 26 is provided with a plurality of grooves 30, or cam surfaces, one for each valve of engine 10 driven by cam shaft 26, for example. It should be noted that cam surface 30 is a circular cam of constant radius with respect to the axis of rotation 28 of cam shaft 26 compared with lobed cams conventionally used in the valve trains of reciprocating internal combustion engines in which the radius to various points on the surface of a lobe varies as a function of the angle.

Figure 7:
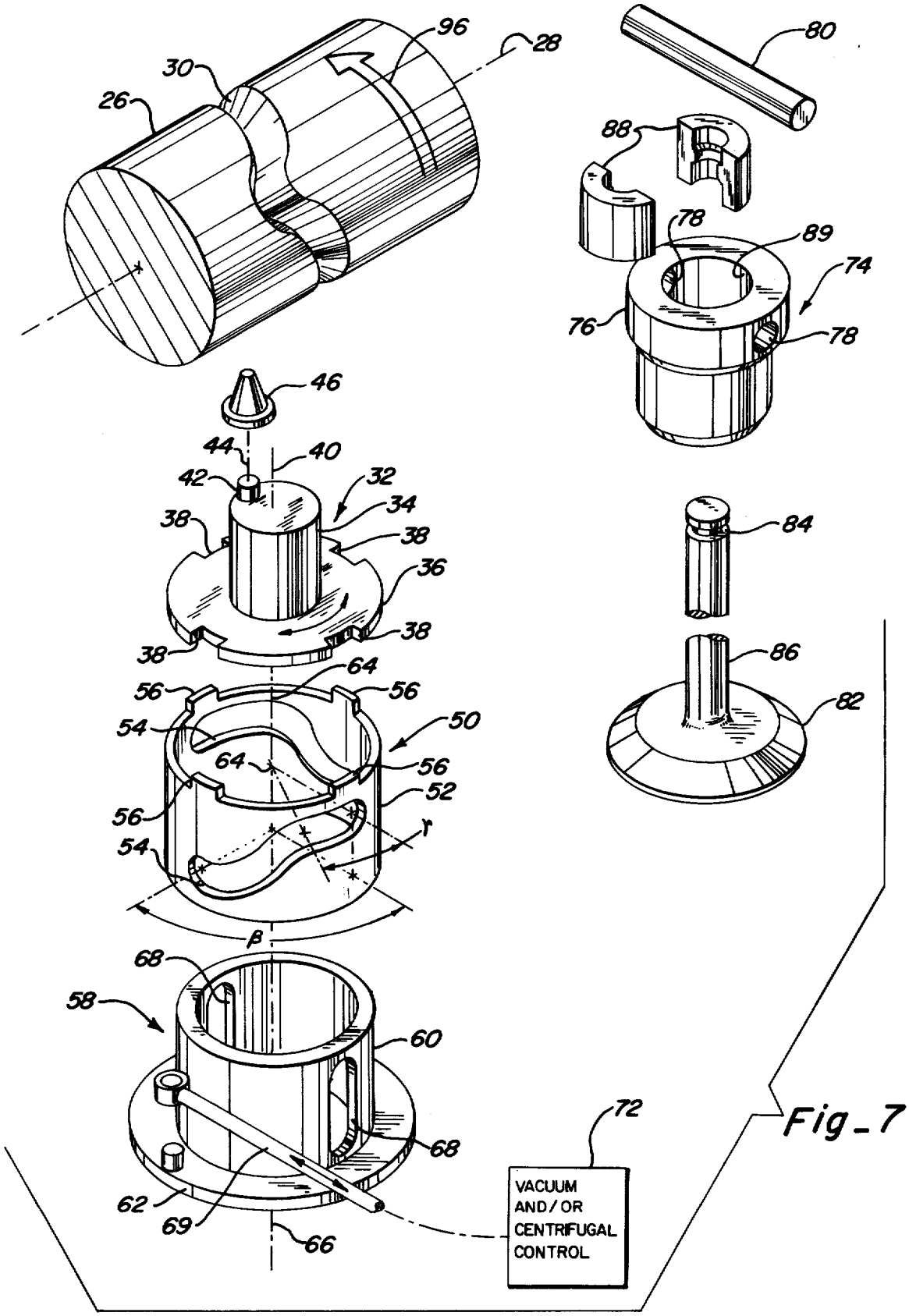
FIG. 7 is an exploded view of the components of one embodiment of a valve train assembly.

Cam follower 32 has a central cylindrical portion 34 and a disk portion 36 rigidly attached to cylindrical portion 34. A plurality of notches 38 are formed in the perimeter of disk 36. Cam follower 32 has a axis of rotation 40. Pin 42 is mounted on the upper end of cylinder 34 remote from disk 36. As can be seen in FIG. 7, the longitudinal axis 44 of cylindrical pin 42 is substantially parallel to but offset from axis 40 of cam follower 32 by a fixed amount. Follower bushing 46 fits on pin 42 and its outer surfaces are designed to engage cam surfaces 30 formed on cam shaft 26.

Figure 2:
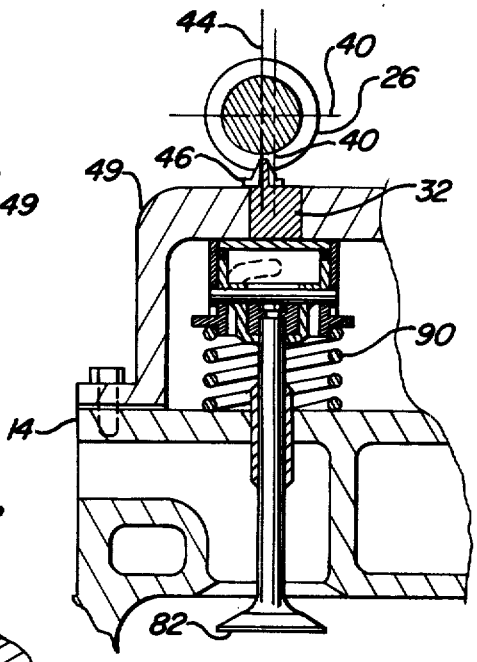
FIG. 2 is a fragmentary side view of a portion of the engine illustrated in FIG. 1.
Figure 5:
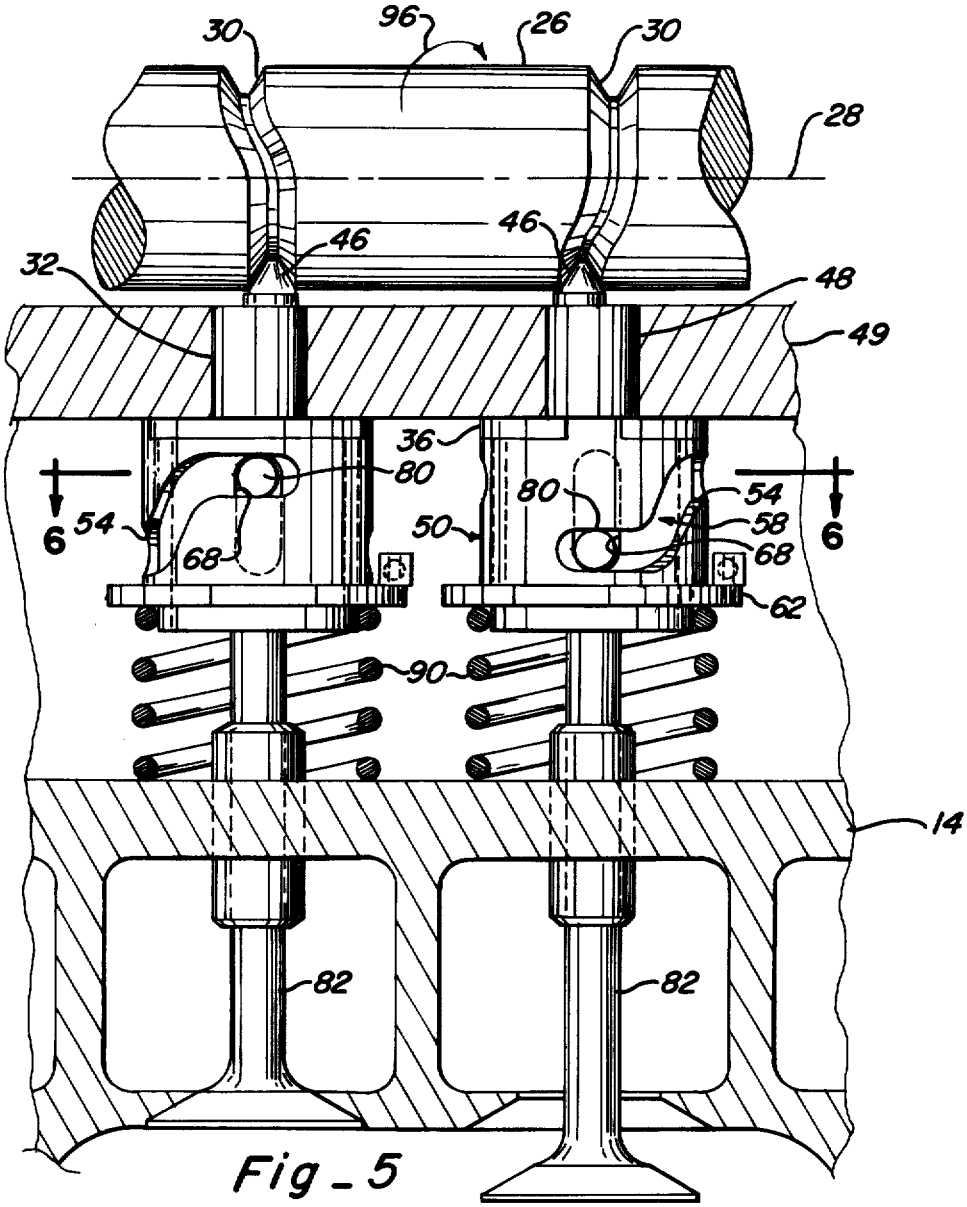
FIG. 5 is an enlarged fragmentary view disclosing details of the valve train of my invention.
Figure 6:
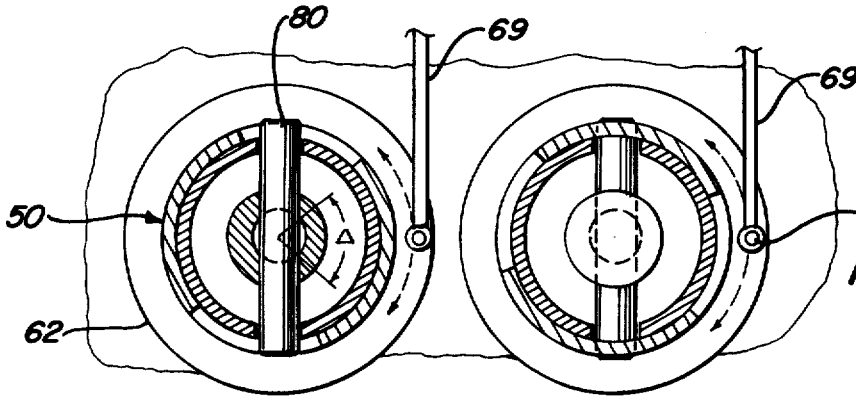
FIG. 6 is a section taken on line 6—6 of FIG. 5.

As can be seen in FIGS. 1, 2 and 5, cam follower 32 is journaled in a bore 48 in support member 49 which is illustrated in FIG. 2 as being bolted to cylinder head 14. Cam follower 32 while mounted in bore 48 is free to rotate reciprocally, or oscillate, about its axis of rotation 40 and is mounted so that follower bushing 46 engages groove 30 in cam shaft 26.

Secondary cam 50 is comprised of hollow cylindrical member 52 in the cylindrical walls of which are formed a pair of cam slots 54. A plurality of lugs 56 are located on the upper end of member 52 and are shaped and located to fit into notches 38 of cam follower 32. The shape and dimension of secondary cam slots 54 are chosen to provide a range of valve timing and valve lift for optimum engine operation over the entire range of operating conditions of the engine in which the valve trains are installed.

Control ring 58 consists of a hollow cylindrical member 60 with a cylindrical disk 62 located near the bottom of member 60. The dimension of cylinder member 60 is such that it has a sliding low friction, fit within cylindrical member 52. The axis 64 of cylindrical member 52 and the axis 66 of cylindrical member 60 substantially coincide when the cylinder 60 is located within cylinder member 52. A pair of slots 68 are formed in the cylindrical walls of member 60 substantially parallel to axis 66. A drive pin 70 is located near the outer perimeter of disk 62. Pin 70 is operatively connected by shaft 69 to a conventional engine rpm or vacuum control, or servo, 72 so that the position of control ring 58 with respect to cylinder head 14, or any similar element of engine 10 that is fixed, can be varied as a function of engine speed, or rpm, and load, intake manifold pressure, as will be described below.

Reciprocating member, or valve keeper, 74 has a portion 76 which has a sliding fit within control ring 58. Transverse bore 78 is formed in member 74 into which cross pin 80 can be inserted. Projecting means, or cross pin 80, when the valve train is assembled, as is illustrated in FIG. 5, for example, passes through slots 68 in control ring 58 and engage cam slots 54 of secondary cam 50.

Poppet valve 82, which is provided with a groove 84 located toward the upper end of its stem 86 is mechanically, or fixedly, secured to reciprocating member 74 by a pair of keys 88 which are held in place in vertical bore 89 by pin 80 when pin 80 is mounted in bores 78 in reciprocating member 74.

Cam follower 32, secondary cam 50 and control ring 58 are held together by the force of coil spring 90 which is illustrated in FIG. 5, for example, as being compressed between the underside of disk 62 of control ring 58 and cylinder head 14.

Figure 4:
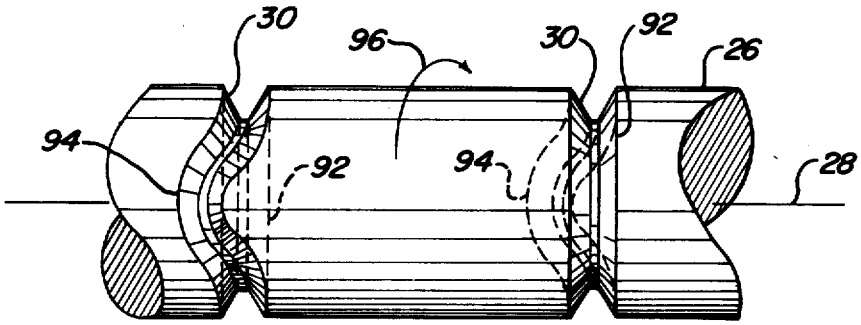
FIG. 4 is a plan view of the cam shaft illustrated in FIG. 1.
Figure 3:
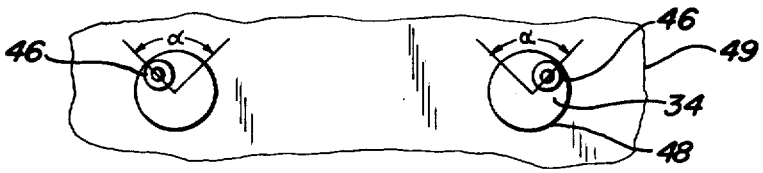
FIG. 3 is a fragmentary plan view taken on line 3—3 of FIG. 1.

In FIG. 4 the shape of the grooves 30 in cam shaft 26 are best illustrated. Each groove 30 has a substantially straight section 92 and a curved portion 94 in which the groove 30 deviates from a circular path in a plane normal to the axis of rotation 28 of cam shaft 26. As shaft 26 rotates in the direction of arrow 96 in FIG. 4 the follower bushing 46 mounted on cam follower 32 engages the surfaces of groove 30 as seen in FIG. 1. Rotation of shaft 26 one complete revolution will cause cam followers 32 to oscillate through an angle alpha as illustrated in FIG. 3. The excursion of cam surfaces 30 from a true circle, the distance between the axis of rotation 40 of follower 32 and axis 44 of pin 42 on which bushing 46 is mounted and the position of the center of shaft 26 with respect to axis 40 of cam follower 32 as seen in FIG. 2 determine the magnitude of alpha. In a preferred embodiment alpha is 90°. Since cam follower 32 is forced to oscillate about its axis by cam surfaces 30, this type of cam and cam follower is called a desmodromic cam.

Reciprocal rotation of follower 32 about its axis of rotation 40 causes a similar rotation, or oscillation, of secondary cam 50 about its axis 64. The engagement of lugs 56 of cam 50 into notches 38 in cam follower 32 provides the mechanical coupling of the two devices which when assembled results in axis 64 of cylinder 52 substantially coinciding with axis 40. The hollow cylindrical member 60 of control ring 58 fits inside hollow cylindrical member 52 of secondary cam 50 with axis 66 of cylindrical member 60 substantially coinciding with axis 64 of secondary cam 50 and the axis of rotation 40 of cam follower 32. The bottom surface of secondary cam 50 engages the top surface of disk 62 of control ring 58. Reciprocating member 74 is located within cylindrical member 60 with projecting means 80 passing through slots 68 of control ring 50 and engaging cam slots 54. Oscillation of secondary cam 50 causes the reciprocating member 74 to move in a reciprocating, or oscillating, linear path along axis 64, for example, since rotation of reciprocating member 74 is prevented by vertical guide slots 68 in control ring 58 which is held in place by shaft 69 which is operatively connected to servo 72.

Coil spring 90 biases control ring 58 toward cam follower 32. When engine 10 is cold, a gap of a few thousandths of an inch exist between the top surfaces of control ring 58, secondary cam 50, and the bottom surface of disk 36 of cam follower 32 to provide for expansion of valve 82 mounted in reciprocating member 74 as well as the other components of a valve train such as are illustrated in FIG. 7, for example.

Figure 8:
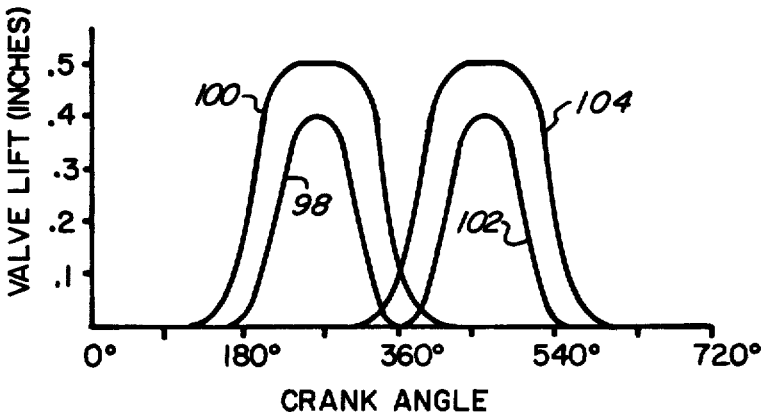
FIG. 8 is a graph of valve lift vs. crankshaft angle produced by an embodiment of a valve train of this invention in a reciprocating internal combustion engine.

The shape of cam slots 54 in secondary cam 50 is chosen so that the timing of the valve 82 of a given cylinder of a reciprocating internal combustion engine will fall within the curves illustrated in FIG. 8. In a preferred embodiment the slots 54 extend through or determine an angle beta of 120° with the portion of the slot extending over an angle gamma, in a preferred case gamma equals 30°, being substantially horizontal as seen in FIG. 7, for example, and with a smaller flat, or horizontal, portion at the other end. The curved portion is chosen to provide optimum valve timing and valve lift as is well known to those skilled in the art.

Servo mechanism 72 and the linkage between it and control ring 58 is designed, in a preferred embodiment, to rotate control ring 58 through an angle delta, in a preferred embodiment delta is 30°, as a function of the rpm of engine 10 [and its] *which may vary with* load. Valve timing and valve lift of the valves of a given cylinder vary for exhaust valves from those for minimum engine speed, curve 98, to those for maximum engine speed, curve 100, and for intake valves from those for minimum speed, curve 102, to those for maximum speed, curve 104. The extent of valve overlap at maximum speed in the embodiment illustrated is approximately 168°. *Thus, timing will change depending on the initial position of projecting means 80 along the portion of the slot 54 extending over the angle gamma. The amplitude or lift will vary if the final position of the projecting*

*means varies along the diagonal portion of slot 54. If this final position is along the lower horizontal position of slot 54 with each initial position of projecting means 80, there will be no amplitude variation.*

Figure 9:
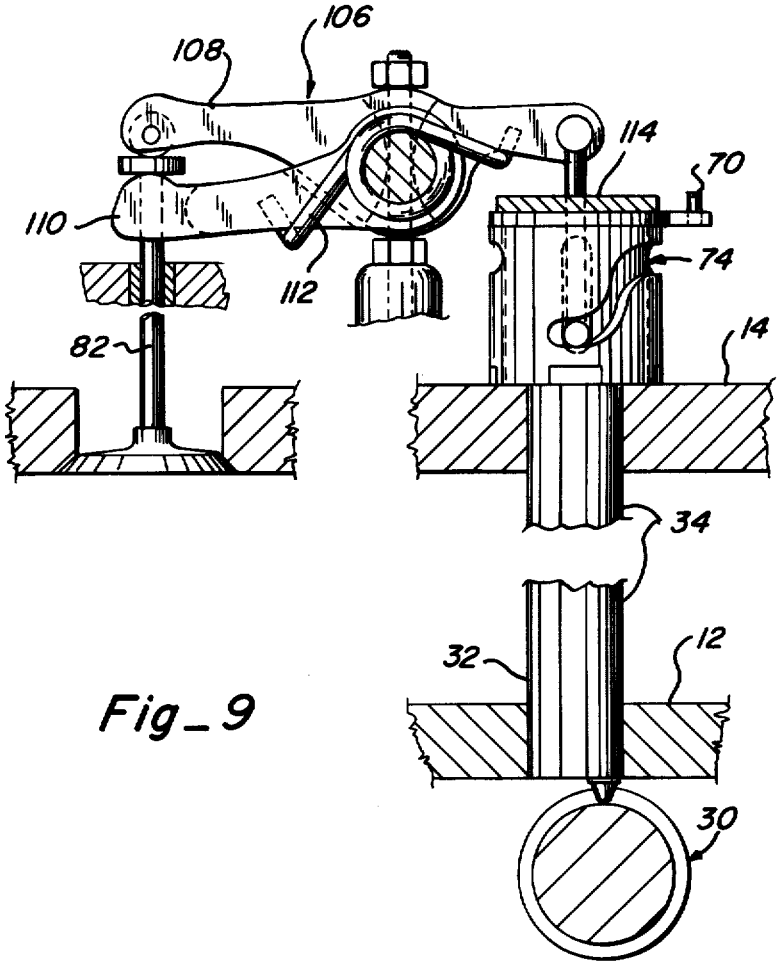
FIG. 9 is a fragmentary view partially in section of a modification of the valve train of my invention in which a valve is connected to the valve train through a rocker arm.

In FIG. 9 there is illustrated a modification of my invention in which poppet valve 82 is operatively connected to reciprocating member 74 by means of rocker arm 106 which is pivotally mounted on cylinder head 14. Valve 82 is held between the jaws 108, 110 of rocker arm 106 with jaw 110 which is pivotally mounted on rocker arm 106 forced toward jaw 108 through the action of torsion spring 112. The significant changes between the embodiment illustrated in FIG. 1 and that of FIG. 9 is that the cylindrical portion 34 of cam follower 32 is extended and what would be the bottom surface of control ring in FIG. 5 is provided with a cover 114 against which the closing force of valve 82 and rocker arm 106 react.

From the foregoing it is clear that the desmodromic cam drive of my invention positively closes as well as opens poppet valves. Thus, it is not necessary for the desmodromic valve train of my invention to overcome the resistance of coil springs conventionally used to bias valves closed and to keep tappets in contact with a lobed cam. This results in a considerable reduction in the amount of energy consumed by the engines and thus increases engine efficiency.

The valve train of my invention also significantly reduces the mass of material undergoing linear oscillation since rotational motion of the cam follower is translated to linear motion in close proximity to the valve to be driven which reduces the forces acting on the components of a drive train.

The secondary cam and the control ring as a result of their design can be fabricated by stamping which minimizes their cost of production. Further the valve operating mechanism varies valve timing and valve lift of a valve in a reciprocating internal combustion engine as a function of engine rpm or speed and load which greatly enhances engine efficiency.

It should be obvious that various modifications can be made to the embodiments of my invention as disclosed herein without departing from the scope of the present invention.

What is claimed is:

1. A valve train for a poppet valve of a reciprocating internal combustion engine comprising:

an internal combustion engine;

a cam shaft having an axis of rotation and being mounted on said engine for rotation about its axis at angular velocities which are a function of engine rpm;

means forming a cam surface on said shaft;

a cam follower having an axis of rotation;

means for mounting said cam follower on said engine in engagement with the cam surface of said cam shaft to convert rotation of said cam shaft into reciprocating rotation of said cam follower about its axis of rotation;

a reciprocating member having projecting means;

cam means operatively connected to said cam follower;

movable control means concentrically mounted with respect to said cam means;

said cam means, control means and projecting means interacting to convert reciprocal rotation of said cam follower to reciprocating linear motion of the reciprocating member substantially along the axis of rotation of said cam follower;

said cam means and control means varying the amplification and timing of said reciprocating member with respect to the angular position of the cam shaft as a function of the position of said control means with respect to said engine;

servo means operatively connected to the control means to vary the control means position to vary the amplitude and timing of the reciprocating member as a function of engine rpm and load;

a poppet valve; and means for operatively connecting said valve to said reciprocating member.

2. The valve train of claim 1 in which the means for operatively connecting said valve to said reciprocating member include a rocker arm pivotally mounted on said engine.

3. In a reciprocating internal combustion engine having a cam shaft mounted on the engine for rotation around the cam shaft's longitudinal axis as a function of engine rpm, the improvements comprising:

means forming a circular cam surface on said cam shaft;

a cam follower having an axis of rotation;

means for mounting the cam follower on the engine to engage the circular cam surface of the cam shaft to convert rotation of the cam shaft into oscillations of said first cam follower through substantially an angle alpha about the cam follower's axis of rotation for each complete rotation of the cam shaft;

first and second hollow cylindrical members, each member having a longitudinal axis, the members being dimensioned so that one slidably fits within the others so when they are so positioned their longitudinal axes substantially coincide;

means forming a pair of cam slots in the first cylindrical member, each slot extending substantially over an angle beta with respect to the first member's axis of rotation, a portion of each slot at corresponding portions extending over an angle gamma with respect to the first member's axis of rotation being substantially horizontal;

means adapted to operationally connect said first member to the cam follower so that the longitudinal axis of the first member substantially coincides with the axis of rotation of the cam follower;

means forming a pair of guide slots in the second member, the slots being substantially parallel to the longitudinal axis of the second member;

resilient means for maintaining said second member concentric with the first member, for slidably engaging the first member and for positioning the first member in operational connection with the cam follower so that the first member oscillates with the cam follower;

a reciprocating member mounted within said first and second members, the reciprocating member having means for engaging the cam and guide slots of said first and second members; and means for positioning the second member relative to the engine as a function of engine rpm and load to vary the timing and magnitude of movement of the reciprocating member with respect to the same shaft;

a poppet valve; and means for operatively connecting the valve to the reciprocating member.

4. In the engine of claim 3 in which the means for operatively connecting the valve to the reciprocating member include a rocker arm pivotally mounted on the engine.

5. In the engine of claim 3 in which the angle alpha is 90°, the angle beta is 120°, and the angle gamma is 30°.

6. A valve operating mechanism for a reciprocating internal combustion engine, which mechanism converts rotational motion of a cam shaft which rotates around its longitudinal axis as a function of engine rpm into reciprocating linear motion of a reciprocating member operatively connected to a valve, and varies the timing and magnitude of movement of the valve as a function of engine rpm and load, comprising:

means forming a circular cam surface on said cam shaft;

a cam follower having an axis of rotation;

a pin having a longitudinal axis, the pin being mounted on the cam follower so that its longitudinal axis is substantially parallel to the axis of rotation of the cam follower but offset from it;

a bushing mounted on the pin;

means for mounting the cam follower with respect to the cam shaft so that the bushing engages the circular cam surface to convert rotation of the cam shaft into reciprocal rotation of the cam follower about its axis of rotation;

a first hollow cylindrical member having a longitudinal axis;

means forming a pair of cam slots in the first member;

means adapted to operationally connect the first member to the cam follower to cause the first member to oscillate about its longitudinal axis with the cam follower;

a second hollow cylindrical member having a longitudinal axis;

means forming a pair of guide slots in the second member, said slots being substantially parallel to the second member's longitudinal axis;

resilient means for mounting the second member so that it is substantially concentric with the first cylindrical member and so that the first member is operatively connected to the cam follower;

a reciprocating member;

projecting means formed on the reciprocating member;

the reciprocating member being positioned within the first and second members with its projecting means engaging the cam slots and guide slots of the first and second members;

means for rotating the second member about its axis relative to the means for mounting the cam follower as a function of the speed and load mechanism of the engine;

a poppet valve; and means for operatively connecting the valve to the reciprocating member.

7. The valve operating mechanism of claim 6 in which the resilient means is a coil spring.

8. The valve operating mechanism of claim 6 in which the means for operatively connecting the valve to the reciprocating member include a rocker arm pivotally mounted on the engine.

9. In a reciprocating internal combustion engine having a crankshaft, a valve train comprising:

a cam shaft having an axis of rotation;

bearing means on the engine mounting the cam shaft for rotation around its axis;

means connecting the cam shaft to the crankshaft of the engine so that the angular velocity of the cam shaft is one-half that of the crankshaft;

a cam surface of circular cross section formed on the cam shaft;

a cam follower having a cylindrical portion, the cylindrical portion having an axis of rotation;

a pin having a longitudinal axis, the pin being mounted on one end of the cylindrical portion so that the pin's longitudinal axis is substantially parallel to the cylindrical portion's axis of rotation but displaced a fixed distance;

a cam follower bushing mounted on the pin;

a cylindrical disk attached to the other end of the cylindrical portion of the cylindrical portion of the cam follower;

means forming a plurality of notches around the periphery of the cylindrical disk of the cam follower;

a journal bearing in the engine, the cylindrical portion of the cam follower mounted in the journal bearing for rotation about its axis of rotation and with the cam follower bushing contacting the cam surface of the cam shaft, the path of the cam surface being such that rotation of the cam shaft causes the cam follower to oscillate through a predetermined angle about its axis of rotation;

a secondary cam having cylindrical walls and longitudinal axis;

means forming a pair of cam slots in the walls of the secondary cam;

a plurality of lugs formed on the secondary cam;

a control ring having cylindrical walls and a longitudinal axis;

a cylindrical disk attached near the bottom of the control ring;

means forming a pair of guide slots in the cylindrical walls of the control ring, said slots being substantially parallel to its longitudinal axis;

the diameter of the outer cylindrical wall of the control ring being slightly less than the diameter of the inner cylindrical wall of the secondary cam;

the secondary cam being mounted around the exterior of the cylindrical walls of the control ring, the lugs on the secondary cam adapted to fit into the means forming notches of the cam follower;

a coil spring positioned between the engine and the bottom surface of the cylindrical disk of the control ring or maintaining the lugs of the secondary cam in the means forming notches in the cylindrical disk of the cam follower so that they will oscillate together;

a valve keeper positioned for linear movement within the inner cylindrical wall of the control ring;

means forming a transverse bore through the keeper;

means forming a vertical bore through the keeper;

a cross pin located in the transverse bore and engaging the means forming cam slots in the secondary cam and the means forming guide slots in the control ring;

a poppet valve;

key means for fixedly securing the valve to the valve keeper;

a drive pin mounted on the cylindrical disk of the control ring; and a servo mechanism connected to the drive pin, the servo mechanism also being connected to the engine and responsive to engine rpm and load for varying the angular position of the control ring with respect to the engine as a function of engine rpm and load, whereby the timing and lift of the valve varies as a function of engine rpm and [speed] *load.*

*10. A valve train for a poppet valve of a reciprocating piston engine comprising:*

*a piston engine;*

*a cam shaft having an axis of rotation and being mounted on said engine for rotation about its axis at angular velocities which are a function of engine rpm;*

*means forming a cam surface on said shaft;*

*a cam follower having an axis of rotation;*

*means for mounting said cam follower on said engine in engagement with the cam surface of said cam shaft to convert rotation of said cam shaft into reciprocating rotation of said cam follower about its axis of rotation;*

*a reciprocating member having projecting means;*

*cam means operatively connected to said cam follower;*

*movable control means concentrically mounted with respect to said cam means;*

*said cam means, control means and projecting means interacting to convert reciprocal rotation of said cam follower to reciprocating linear motion of the reciprocating member substantially along the axis of rotation of said cam follower;*

*said cam means and control means varying the timing of said reciprocating member with respect to the angular position of the cam shaft as a function of the position of said control means with respect to said engine;*

*means operatively connected to the control means to vary the control means position to vary the timing of the reciprocating member;*

*a poppet valve; and*

*means for operatively connecting said valve to said reciprocating member.*

*11. A valve train for a poppet valve of a reciprocating piston engine comprising:*

*an internal combustion engine;*

*a cam shaft having an axis of rotation and being mounted on said engine for rotation about its axis at angular velocities which are a function of engine rpm;*

*means forming a cam surface on said shaft;*

*a cam follower having an axis of rotation;*

*means for mounting said cam follower on said engine in engagement with the cam surface of said cam shaft to convert rotation of said cam shaft into reciprocating rotation of said cam follower about its axis of rotation;*

*a reciprocating member having projecting means;*

*cam means operatively connected to said cam follower;*

*movable control means concentrically mounted with respect to said cam means;*

*said cam means, control means and projecting means interacting to convert reciprocal rotation of said cam follower to reciprocating linear motion of the reciprocating member substantially along the axis of rotation of said cam follower;*

*said cam means and control means varying the timing of said reciprocating member with respect to the angular position of the cam shaft as a function of the position of said control means with respect to said engine;*

*servo means operatively connected to the control means to vary the control means position to vary the timing of the reciprocating member as a function of engine rpm;*

*a poppet valve; and*

*means for operatively connecting said valve to said reciprocating member.*

* * * * *